United States Patent
Peterson et al.

(10) Patent No.: US 8,948,975 B2
(45) Date of Patent: Feb. 3, 2015

(54) AGRICULTURE COMBINATION MACHINES FOR DISPENSING COMPOSITIONS

(75) Inventors: John Peterson, Jackson, MN (US); David John Ringeisen, Sherburn, MN (US)

(73) Assignee: AGCO Corporation, Duluth, GA (US)

( * ) Notice: Subject to any disclaimer, the term of this patent is extended or adjusted under 35 U.S.C. 154(b) by 63 days.

(21) Appl. No.: 13/284,450

(22) Filed: Oct. 28, 2011

(65) Prior Publication Data

US 2013/0110357 A1    May 2, 2013

(51) Int. Cl.
- A01B 79/00    (2006.01)
- A01M 7/00    (2006.01)
- A01C 21/00    (2006.01)

(52) U.S. Cl.
CPC .............. *A01M 7/0089* (2013.01); *A01C 21/00* (2013.01)
USPC ..................................... 701/50; 70/36; 70/49

(58) Field of Classification Search
CPC ............................... A01C 21/00; A01C 21/005
USPC ................................................ 701/36, 49, 50
See application file for complete search history.

(56) References Cited

U.S. PATENT DOCUMENTS

| | | | | |
|---|---|---|---|---|
| 4,961,533 | A | * | 10/1990 | Teller et al. ................. 177/25.19 |
| 5,226,558 | A | | 7/1993 | Whitney et al. |
| 5,638,285 | A | | 6/1997 | Newton |
| 5,737,221 | A | | 4/1998 | Newton |
| 6,097,995 | A | | 8/2000 | Tipton et al. |
| 6,144,910 | A | * | 11/2000 | Scarlett et al. .................. 701/50 |
| 6,213,299 | B1 | | 4/2001 | Rossi |
| 6,963,881 | B2 | * | 11/2005 | Pickett et al. ........................... 1/1 |
| 7,188,450 | B2 | * | 3/2007 | Raun et al. ................ 47/58.1 SC |
| 7,857,237 | B2 | * | 12/2010 | Vickers et al. .................... 239/69 |
| 8,265,835 | B2 | * | 9/2012 | Peterson et al. ................. 701/50 |
| 8,505,808 | B2 | * | 8/2013 | Peterson et al. .............. 235/375 |
| 8,571,764 | B2 | * | 10/2013 | Peterson et al. ................. 701/50 |
| 8,666,611 | B2 | * | 3/2014 | Peterson et al. ................. 701/50 |
| 2003/0036852 | A1 | | 2/2003 | Ell et al. |
| 2004/0088330 | A1 | | 5/2004 | Pickett et al. |
| 2007/0083293 | A1 | | 4/2007 | Applegate |
| 2007/0267228 | A1 | | 11/2007 | Reinsch et al. |
| 2009/0039172 | A1 | | 2/2009 | Vickers et al. |
| 2009/0050704 | A1 | | 2/2009 | Harrison, Jr. |
| 2009/0132132 | A1 | * | 5/2009 | Peterson et al. ................. 701/50 |
| 2010/0070072 | A1 | | 3/2010 | Goldman |
| 2010/0256878 | A1 | * | 10/2010 | Zegowitz ......................... 701/50 |
| 2011/0035055 | A1 | | 2/2011 | Applegate |

(Continued)

FOREIGN PATENT DOCUMENTS

| | | |
|---|---|---|
| DE | 4307389 A1 | 9/1994 |
| DE | 102010023380 A1 | 12/2011 |

OTHER PUBLICATIONS

International Search Report for PCT/US2012/062381 dated Feb. 18, 2013.

*Primary Examiner* — John Q Nguyen
*Assistant Examiner* — Michael Whalen

(57) ABSTRACT

In one embodiment, a combination machine comprising: a towed machine; and a towing machine physically coupled to the towed machine, wherein the towing machine tows the towed machine, wherein the towing machine comprises a machine control system configured to: scan a smart label, the smart label affixed to a container containing a composition to be dispensed by the towed machine; and automatically adjust controls of the towing machine and the towed machine based on the scanned information.

14 Claims, 7 Drawing Sheets

(56) References Cited

U.S. PATENT DOCUMENTS

| | | |
|---|---|---|
| 2011/0139302 A1 | 6/2011 | Pell et al. |
| 2012/0016517 A1* | 1/2012 | Holland ............. 700/225 |
| 2012/0259537 A1* | 10/2012 | Schmidt et al. ............ 701/300 |
| 2012/0310496 A1* | 12/2012 | Peterson et al. ............. 701/50 |
| 2013/0103211 A1* | 4/2013 | Peterson et al. ............. 700/284 |
| 2013/0105583 A1* | 5/2013 | Peterson et al. ............. 235/492 |
| 2013/0105591 A1* | 5/2013 | Peterson ............. 239/1 |
| 2013/0110292 A1* | 5/2013 | Peterson et al. ............. 700/283 |

* cited by examiner

US 8,948,975 B2

AGRICULTURE COMBINATION MACHINES FOR DISPENSING COMPOSITIONS

TECHNICAL FIELD

The present disclosure is generally related to agricultural field dispensing systems and, more particularly, controlling the accurate dispensing of product.

BACKGROUND

Today, an operator of an agricultural machine for dispensing product (e.g., chemical composition), such as a sprayer machine, reads and generally familiarizes himself with all of the necessary elements or components from a spray chemical label that is used to properly set up a sprayer machine. Generally, these labels are difficult to read, with the needed information often buried in a sea of general information and disclaimers. Once the operator has ferreted out the needed information, he manually sets up the sprayer machine accordingly.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
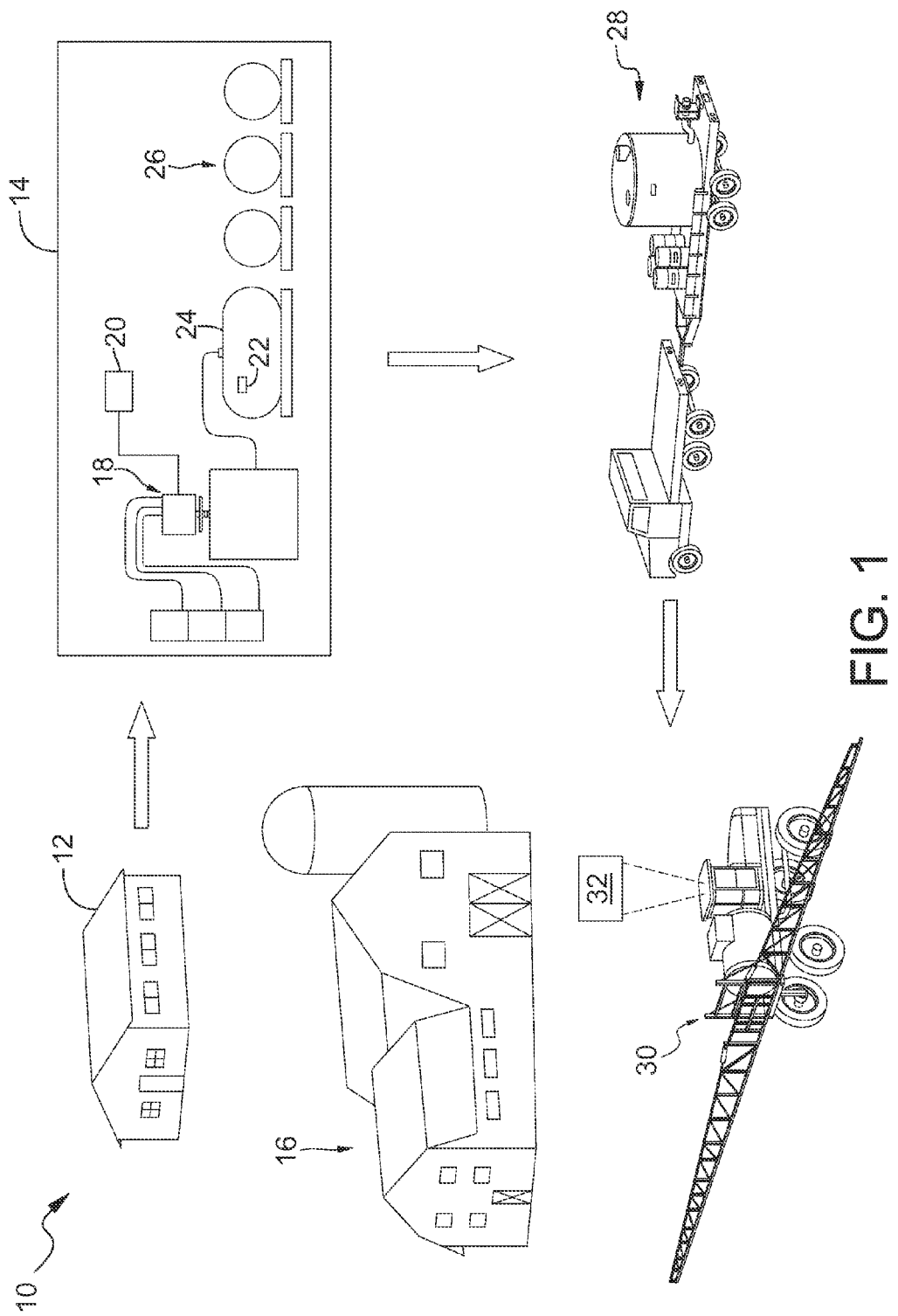
FIG. 1 is a schematic diagram that illustrates an example environment in which certain embodiments of smart label systems and machine control systems may be used.

In one embodiment, a combination machine comprising: a towed machine; and a towing machine physically coupled to the towed machine, wherein the towing machine tows the towed machine, wherein the towing machine comprises a machine control system configured to: scan a smart label, the smart label affixed to a container containing a composition to be dispensed by the towed machine; and automatically adjust controls of the towing machine and the towed machine based on the scanned information.

Detailed Description

Certain embodiments of machine control systems and smart label systems and associated methods are disclosed that help to prevent (or at least mitigate the risk of) the misapplication of chemical compositions to vegetation (e.g., consumable crops, plants, weeds, etc.) in a field subject to harvesting (e.g., crop field). In one embodiment, a smart label machine located at a dispensing facility provides a smart label comprising a recipe or formulation (herein, referred to as recipe) specific to a given locale or geofence, and assigns the smart label to a container. The container contains a composition based on the recipe, the composition to be applied to vegetation in a given field corresponding to the geofence. The container is transported to the field (e.g., via a tender, tote, etc.) for transfer of the contents of the container to a sprayer machine. The sprayer machine is equipped with a machine control system that, in one embodiment, scans (e.g., reads) the smart label of the container to set machine controls based on the scanned information (e.g., including the recipe) of the smart label.

In other words, and focusing for instance on the field job site (e.g., crop field), the machine control system of the sprayer machine is equipped with reader logic that enables the reading of the smart label affixed to a container (e.g., a container that mounts to the machine or contains contents to be transferred to a container on the machine). The machine control system may download key elements of the smart label, such as in a plain language format, and set the sprayer machine operating parameters to enforce the downloaded smart label directions (e.g., instructions). Such directions may include setbacks and buffer zones, among other directions for applying the composition. Compared to conventional systems where the user parses through a litany of information on a label to enable setting machine controls, the smart label system performs this function automatically. Another benefit is that certain embodiments of machine control systems integrate with geofencing systems to ensure that the composition is dispensed in (applied to) the intended areas. In other words, the machine control system of the sprayer machine causes the sprayer machine to maintain a threshold distance from certain area attributes (e.g., a neighbor's flower garden, waterways, etc.) and/or temporarily suspend the dispensing of the composition to certain zones (e.g., geofenced areas) located within the field. In some embodiments, there may be geofences serving as boundaries for objects (e.g., stationary or mobile) residing in a given field, for which certain embodiments avoid applying a given composition based on information scanned by the reader logic. In some embodiments, the machine control system of the sprayer machine may actuate an alarm to alert the operator at a time corresponding to the traversal of such areas to provoke operator involvement or interaction (e.g., confirmation, investigation, etc.).

In some embodiments, the avoidance of a misapplication may be further advanced by the dispensing of the composition (e.g., at the dispensing facility) into color-coded containers. For instance, the surface (e.g., the entire surface, though in some embodiments, colored in part via a stripe or stripes applied around the circumference, or other mechanisms of identification) of the container for chemical composition A may have an orange tint, whereas the surface of a container for chemical composition B (or a fuel tank) may have a green tint, etc. These examples are for illustration only, and other colors or manner of application of the colors may be used as is clear from the description below.

Note that the employment of smart label systems at the dispensing facility and the machine control systems at the field enables traceability throughout the entire purchase and use process, enabling a chain of custody to be established for purposes of record keeping.

Having summarized certain features of smart label systems and machine control systems of the present disclosure, reference will now be made in detail to the description of the disclosure as illustrated in the drawings. While the disclosure is described in connection with these drawings, there is no intent to limit it to the embodiment or embodiments disclosed herein. For instance, in the description that follows, the focus is on agricultural implementations using fluid spray chemicals to be applied to vegetation as well as fuel compositions to power the sprayer machine, with the understanding that other industries that dispense these or different chemicals (e.g., fluid or particulates or gas) via a machine onto live or inanimate objects may likewise benefit from the disclosed embodiments, and hence are contemplated to be within the scope of the disclosure. For instance, contemplated within the scope of the present disclosure are seeding applications, where application of the composition is not necessarily directed to a given crop. Also, though sprayer machines are described, other machines that dispense compositions (e.g., seed, fertilizer, pesticides, etc.) may be implemented, including self-propelled vehicles and combination-type machines, such as a towed machine and a towing machine coupled thereto (also collectively referred to as a machine). Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is an example environment 10 in which certain embodiments of smart label systems and machine control systems may be employed. The environment 10 depicted in FIG. 1 is used to illustrate how smart label systems and machine control systems may be used to facilitate a complete record of the purchase, generation, and application of a composition (e.g., product). One having ordinary skill in the art should appreciate in the context of the present disclosure that the example environment 10 is merely illustrative, and that smart label systems and machine control systems may be implemented in other environments. The environment 10 includes several points of interest, including a co-op office 12, a dispensing facility 14 (e.g., associated with the office 12), and a farm 16. In one example process, among others, a customer, such as a farmer or his or her representative, visits an agent at the co-op office 12 to place an order for one or more compositions to apply to vegetation in one or more portions of a given field. The requested composition may be a herbicide, fungicide, pesticide, fertilizer, etc., used to treat the vegetation (e.g., crop, weeds, plants, etc.), or in some implementations, seeding or a combination of these components (e.g., seed and fertilizer).

The farmer may verify with the agent at the co-op office 12 the geofence for one or more portions of the farmer's field, as well as the desired composition to be applied to the vegetation. A geofence refers herein to the boundaries of the field, or a subset(s) of the field (e.g., portions, objects, etc.), and may identify buffer zones (and/or setbacks to maintain a distance from sensitive areas) containing certain area attributes (e.g., waterways, neighbor areas, roadways, etc.). Ultimately, the farmer leaves the co-op office 12 with an invoice and/or other documents that provides a recipe of the purchased composition or compositions. The recipe refers to the necessary ingredients or formulation needed to properly mix constituent components to derive or create the final composition to be applied to crop (or dispensed in the machine, such as a fuel composition), such as for a given geofence or geofences. Such ingredients are based (at least in part) on the geofence information, which may include the amount of gallons required (e.g., based on the amount of area subject to application of the composition), the dilution factor (if any), the appropriate mix of constituent components, environmental conditions, sprayer assembly operating parameters or performance (e.g., nozzle size, droplet size, etc.), machine operating parameters (e.g., speed, height of sprayer assembly relative to the vegetation height, etc.), among other factors.

Upon negotiating the terms of the purchase at the co-op office 12, the farmer may travel to the dispensing facility 14 (e.g., across the street) of the co-op with the invoice containing the recipe of the composition(s), among recipes for other purchases, such as fuel, washing fluids, etc. The dispensing facility 14 comprises a chemical shed that may include one or more mixing machines 18 (one shown). In this example, the mixing machine 18 is coupled to a smart label machine 20 (e.g., computer system) that acquires the recipe in the invoice and writes the recipe to a smart label 22 that is affixed to a container 24. In one embodiment, the recipe is specific to the geofence as conveyed by the farmer to the co-op agent and the farmer, and may be downloaded from a computer system at the co-op office 12 (e.g., via wired or wireless communication, such as over a network), transferred using a memory device (e.g., memory stick) that receives the information from the computer system residing at the co-op office, or manually entered by a technician at the dispensing facility 14 (e.g., based on a reading of the recipe from the invoice), among other mechanisms of transfer of information.

The smart label machine 20 may generate the smart label 22 and affix (e.g., via machine or manual assembly) the smart label 22 to the container 24, hence assigning the smart label 22 to the container 24. In some embodiments, each container 24 may have its own, re-usable smart label 22 affixed to the container, the smart label 22 comprising information that is changed via signaling (e.g., via a write operation that replaces the previous information) from the smart label machine 20, and hence the smart label with the changed information (e.g., new recipe) is newly assigned to the container 24. The smart label machine 20 comprises, in one embodiment, reader logic (e.g., fixed or mobile), as embodied in hardware and/or software in a device, that enables read capability or read/write capability (e.g., electromagnetic communication between the smart label 22 and the reader logic), as well as computer componentry that includes additional software/firmware and a user interface (e.g., display, keyboard, mouse, microphone, etc.) that enables interaction between a technician and the mixing machine 18. Herein, such read or read/write functionality is also generally referred to herein individually, or collectively, as scanning. In one embodiment, the smart label machine 20 comprises a smart label system, though in some embodiments, the smart label system may encompass a subset of the smart label machine 20, or additional components in some embodiments.

A user interface to the smart label machine 20 enables a technician to cause the writing of the recipe to the smart label 22 (e.g., via overwriting previous information, such as a recipe from another job). In one embodiment, the writing may be achieved automatically, such as responsive to receiving the recipe from the computer system residing at the co-op office 12 via a communication channel (e.g., over a network(s), such as a local area network (LAN) and/or wide area network, (WAN), such as the Internet) while the destined container 24 is in proximity to the reader range, responsive to acceptance at an input/output (I/O) port of the mixing machine 18 or smart label machine 20 of a memory device that contains the downloaded recipe when the container 24 is within range, or during or after the mixing of the constituent components to derive the composition according to the recipe. In some embodiments, the user interface may be used to enter the recipe manually (e.g., via a technician, as read from the invoice).

In some embodiments, such as for bar-code type smart labels, the smart label 22 may actually be generated by the smart label machine 20 and output as a single-use tag to affix to the container 24. The smart label 22 in such an embodiment may be manually affixed to the container 24, or in some embodiments, an automated mechanism (e.g., a robotic arm, engraver, silk-screen, etc.) may be employed to affix (including imprint, engrave, etc.) the smart label 22 to the container 24. Note that tag and label are used interchangeably throughout the disclosure.

The smart label 22 may comprise a radio frequency identification (RFID) tag (e.g., passive, active, battery-assisted passive, etc.), a bar code, or like variations (e.g., QR code) or devices that enable scanning of the smart label 22 by reader logic to extract information (e.g., a recipe, among other information, such as purchaser information, vendor information, date, time, etc.) from the smart label 22 and/or to write the same or similar information to the smart label 22. In some embodiments, as indicated above, the information on the smart label 22 may be overwritten with new information. Overwriting may be achieved in some embodiments responsive to the proper authentication/authorization. Note that the smart label may take on other forms that need not be RFID-based. For instance, in some embodiments, the smart label 22 may be a code (e.g., binary, alphanumeric, etc.) that an operator reads from the container 24 and enters at a user interface to the smart label machine 20, or when proximal to the field, enters at the machine (e.g., sprayer machine) via a user interface. Hence, the code is received at the sprayer machine, not via RFID-scanning technology, but user input or other non-RFID reading means (e.g., somewhat similar to OCR-type methods, such as image capture, or via non-RFID sensors (e.g., image capture equipment) at the smart label machine 20 or sprayer machine or other machine).

In some embodiments, the choice of container 24 for a given composition may be specific to the composition to be contained therein, or specific to the composition and purchaser (or order of invoice for a particular day), among other factors for selection. For instance, the container 24 may be delivered to the mixing machine 18 via a conveyor or manually transported (e.g., via personnel driving a forklift or using another tool), and chosen from among a plurality of containers 26 based on a detected (e.g., from one or more sensors associated with the mixing machine 18 and/or smart label system) color tint applied to the surface of the container 24. In other words, a blue surface color may always be chosen for composition A, whereas a green surface color is always chosen for composition B, etc. Alternatively, an orange surface color may be selected for purchaser A's composition A, and a gray surface color may be selected for purchaser A's composition B (or a composition for purchaser B). Note that the coloration may be over the entire surface of the container 24, or enough to visibly distinguish one container 24 over others 26, such as via a single-colored stripe over the circumference of a container (e.g., tank), or a large patch of the given color over a portion of the surface. In some embodiments, multiple (e.g., dual) colors may be used to distinguish the purchaser and the dispensed composition, such as when multiple factors are the basis for the selection. In some embodiments, the surface may be distinguished by an overlapping material affixed to the surface, such as a flag or band of fabric material affixed to or wrapped around the container 24.

The dispensing from the mixing machine 18 of compositions to one of a plurality of different colored containers 24, 26 provides, in addition to the smart label 22, an extra degree of protection from inadvertent application of the wrong composition to a given field once the composition is transported to the field. Further, the coloration may also serve as a redundant scheme to avoid errors in dispensing of composition at the dispensing facility 14 (or elsewhere, such as at the farm 16). For instance, selection of a container 24 for dispensing of the composition from the mixing machine 18, when done through automation, may be accomplished through the use of sensors (e.g., image acquisition equipment) in the dispensing facility 14 that, responsive to processing of the invoice, searches for a given color corresponding closest to a recipe to be processed and/or purchaser that trigger the unloading (e.g., to a conveyor or alerting to a manual loader) of the appropriate container 24.

In addition to, or in lieu of the aforementioned selection functionality, similar sensors may be employed proximally to the mixing machine 18 to ensure that the appropriate container 24 is loaded beneath or adjacent to the output of the mixing machine 18 or a coupled conduit, such as a hose coupled to the mixing machine 18. For instance, the smart label machine 20 (or mixing machine 18 in some embodiments), may comprise logic that compares certain parameters of the recipe to the color of the container 24, and if there is not a match (e.g., a threshold match, say 60%) between the recipe and stored information that describes what type of composition and/or purchaser is associated with the container 24 loaded underneath or adjacent to the output, an alarm may be triggered to alert the technician to investigate the discrepancy or mismatch.

In some embodiments, such as where a permanent smart label 22 is affixed to the loaded container 24, a comparison may be made between the recipe and the information to be overwritten in the smart label 22 of the loaded container 24 and a determination of the appropriateness of the container selection based on the degree of matching of information. In some embodiments where the choice of container 24 is less automated, the coloring of the container 24 may serve as a way to enable a technician to ensure selection of a proper container 24 (e.g., through visual distinction). In some embodiments, there is no need for such discernment as all containers 24, 26 are thoroughly washed and re-used among multiple parties and compositions and/or there are no distinctive colors (e.g., uniform or substantially uniform in appearance).

Once the composition corresponding to the invoiced recipe is dispensed into the container 24, the container 24 is loaded (e.g., via forklift, or other loading mechanisms) onto a transport vehicle 28 for delivery of the composition to the farm 16.

At the farm 16, several different mechanisms may be employed to transfer the composition to a machine, such as a sprayer machine 30. Note that the sprayer machine 30 may be embodied as a self-propelled machine with a primary function of spraying vegetation using a sprayer assembly, or in some embodiments, may be comprised of a tractor or other machine coupled to and towing a trailer, the trailer comprising a sprayer assembly located thereon (or seeder or other dispensing machine). Herein, whether a tractor/trailer combination or self-propelled, each is referred to herein as a machine or sprayer machine 30. One mechanism for transferring the composition may involve loading the actual container 24 onto the sprayer machine 30. In other words, the container 24 may be removable, and may have been previously transported by the farmer (or picked up and transported by co-op personnel) to the dispensing facility 14 for dispensing of the composition (and hence, re-use), or the sprayer machine container may be replaceable with other like-configured containers. In the latter example, the prior container is removed from the sprayer machine 30 and returned to the dispensing facility 14, and the new transported container 24 is loaded onto the sprayer machine 30 in its place.

As another example mechanism, the transport vehicle 28 may be equipped with a hose, conveyor, or other similar-functioning device that enables the transfer of the composition from the container 24 to another container mounted on the sprayer machine 30. Such features may be found in totes or tenders available today.

Prior to loading the composition (e.g., by any of the aforementioned mechanisms or otherwise) to the sprayer machine 30 (or in some embodiments, responsive to loading the composition), one embodiment of a machine control system 32 of the sprayer machine 30 determines whether the proper composition is to be loaded for the given geofence the sprayer machine 30 is about to traverse. For instance, the machine control system 32 may include reader logic that scans the smart label 22 and determines whether the container 24 contains a matching composition intended for the detected (e.g., via a global positioning system (GPS) device) geofence of the current location of the sprayer machine 30. In other words, the machine control system 32 may comprise, in one embodiment, a GPS device that detects the coordinates of the geofence for the field (or portion thereof) the sprayer machine 30 is currently adjacent to or programmed to advance upon next, and the machine control system 32 compares the detected coordinates (or in some embodiments, the programmed coordinates) with information in the smart label 22. A mismatch between geofence coordinates and the geofence information in the smart label 22 may result in an alert (e.g., audio and/or visual alert) being presented to the operator, disablement of all or a portion of the machine controls, a signaling (e.g., over a wireless network) to a remote manager or remote device, or a combination of all of these actions. For instance, in the case where the composition is to be loaded via a hose or conveyor that enables transfer of the composition from the container 24 to the container residing on the sprayer machine 30, the machine control system 32 may prevent (e.g., via actuation, or prevention of actuation of a valve, pump, or other controlled device) the ingress of the composition to the sprayer machine container.

In some embodiments, a sensor (e.g., image capture equipment) of the machine control system 32 may flag (e.g., alert or signal) a visual mismatch between the container color and the color expected based on the geofence. In sensor-assisted embodiments, the determination of whether the proper composition is loaded or about to be loaded may be supplemental to the smart label scanning operation, or used in lieu of the smart label scan. One result of the alert is to provoke operator investigation (or investigation by a farm manager, among other personnel).

In some embodiments, the aforementioned automated determination functionality may be optional. In other words, there may be a programmed presumption that the composition loaded to the sprayer machine 30 is the proper composition, or reliance may be placed on a visual check by the operator. For instance, there may be a visual check by the operator of the sprayer machine 30 that offers a self-check or confirmation that the proper composition is present at the site (e.g., the composition arrived in a blue container, the blue container normally used for compositions of the same or similar recipe).

Once the composition is loaded into the sprayer machine 30, and confirmed as the proper composition for the geofence area about to be traversed, the machine control system 32 adjusts the machine controls in accordance with the recipe scanned from the smart label 22. Digressing briefly, the recipe is based on certain operating conditions and/or parameters, such as environmental temperature, wind speed, direction, sprayer machine vehicle speed, sprayer assembly height relative to the vegetation height, nozzle performance of the sprayer, among other factors. The machine control system 32 (e.g., including the reader logic) scans the recipe from the smart label 22 and adjusts the various machine controls. The machine controls include machine navigation controls (e.g., speed, direction, etc.) and dispensing controls such as sprayer assembly controls (e.g., pump settings, valve settings, nozzle selection and settings, which influences spray patterns, droplet size, sprayer assembly height, etc.) or seeding assembly (e.g., pneumatic or otherwise) controls. In some embodiments, one or more of the machine controls may be adjusted based on user confirmation of the associated parameter settings, such as via a user interface (e.g., graphical user interface or GUI) that provokes a user confirmation of the setting (s) on a screen of a display device coupled to the machine control system 32. For instance, prior to adjusting a setting for nozzle selection, there may be a prompt on the GUI that alerts the operator of the forthcoming automatic adjustment, and requests the operator to confirm or approve the setting adjustment. In some embodiments, the GUI may prompt the operator to make the adjustment manually.

Note that the adjustment to settings or parameters of the machine controls of the sprayer machine 30 may be a dynamic process. For instance, as the sprayer machine 30 advances in the field and applies the composition to the field (e.g., the vegetation of the field or the soil), a GPS device and processing unit of the machine control system 32, based on knowledge of geofence information from the scanned smart label 22, may signal to each other that the sprayer machine 30 is about to encroach upon a buffer zone (e.g., which may also be defined by a geofence). The information extracted from the smart label 22 may include navigation directions (e.g., path coordinates) to avoid the application of the composition to certain area attributes, such as waterways. Upon detection (via the GPS device) of the impending boundary of the waterway, the processor unit of the machine control system 32 may cause the sprayer controls to stop the dispensing of the composition until the sprayer machine 30 has passed the buffer zone, and then the sprayer controls are re-actuated to continue the dispensing or application of the composition to the field (e.g., vegetation or soil). The GPS device and acquired geofence information may likewise be used by the machine control system 32 to maintain the sprayer machine 30 a threshold distance from certain area attributes (or other machines in the field) while continuing the disbursement of the composition, such as setbacks from roadways, flower beds (e.g., of adjacent neighbor property), etc.

The use of the smart label 22 to adjust the machine controls enables a more efficient use of the composition, eliminating or reducing waste, and avoiding the misapplication of the composition. When the sprayer machine 30 has completed one area of the field (e.g., one portion or geofence of the field), the operator of the sprayer machine 30 may replace the composition with another composition (e.g., through an automated process, manual process, or a combination of both) that is based on a second geofence (i.e., application to a second portion of the field). A similar determination of the appropriateness of the composition to the next geofence may optionally be employed, and a similar automated settings process is embarked upon in view of the new information for tailored operation of the sprayer machine 30 for the next geofence.

In addition, the smart label 22 may be scanned for other compositions, such as those pertaining to fuel, window washing fluid, among others. For instance, the machine control system 32 scans the smart label 22 affixed to the container for, say, fuel, and a determination may be made that the proper fuel grade is brought to the field. Errors in the extracted information pertaining to the supplied fuel grade (e.g., that do not match stored parameters regarding the proper fuel grade) may result in an alert to the operator, provoking the operator to investigate.

Figure 2:
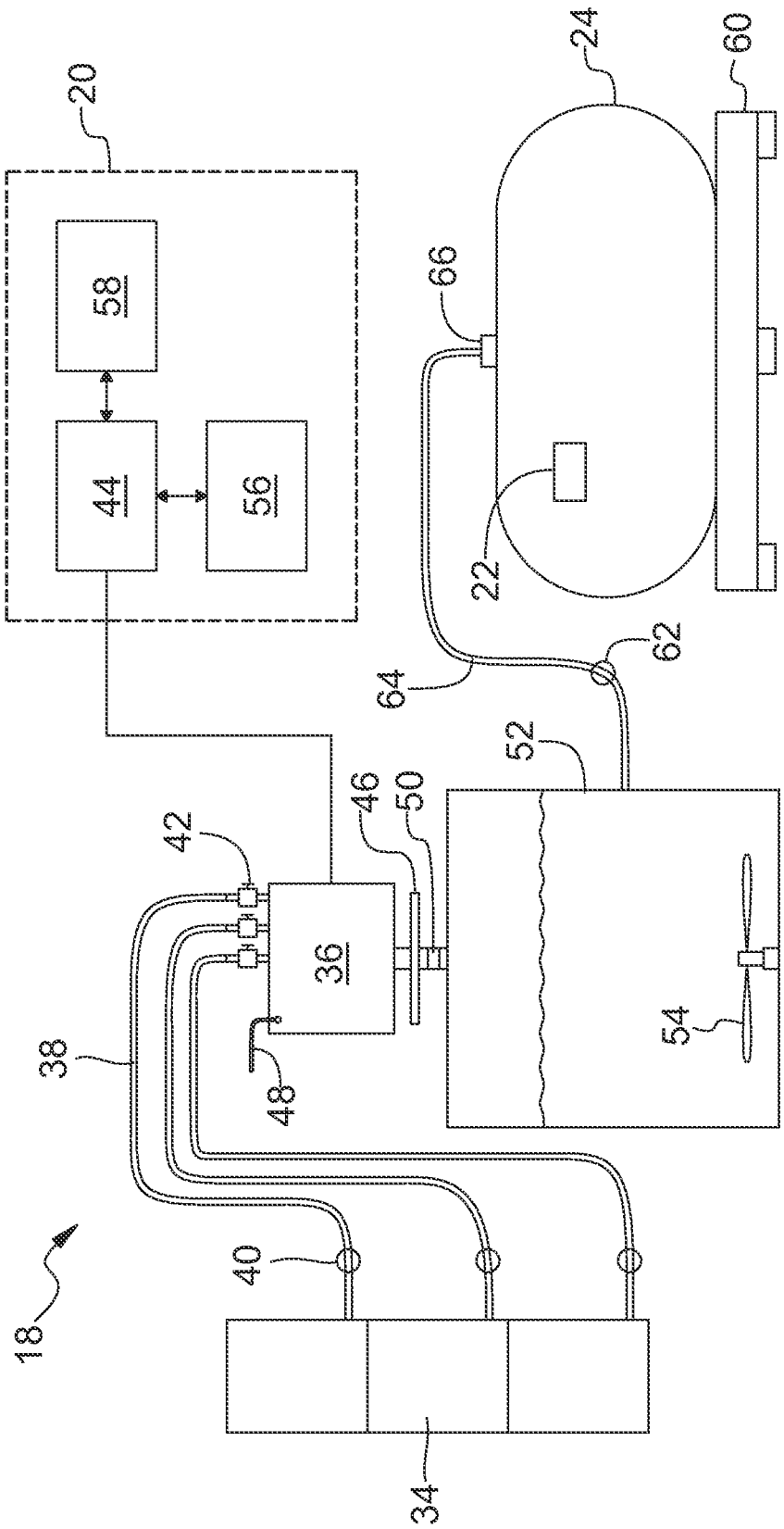
FIG. 2 is a block diagram of an example embodiment of a mixing machine and associated smart label system used for dispensing a composition to a container and assigning a smart label to the container.

Having described an example environment 10 in which the machine control system 32 and/or smart label system 20 may operate, attention is directed to FIG. 2, which illustrates an example mixing machine 18 coupled to a smart label machine 20. One having ordinary skill in the art should appreciate in the context of the present disclosure that the example mixing machine 18 and smart label machine 20 are merely illustrative, and that other architectures and/or configurations with like functionality may be employed in some embodiments. In the example of liquid applications, the mixing machine 18 comprises separate containers, such as container 34, containing constituent components of a given recipe to be mixed to derive a composition. The containers 34 are coupled to a pre-mix receiving tank 36 via one or more conduits 38 (e.g., tubes, hoses, piping, conveyors (for solids), augers (for solids), etc.) that enable the flow of a given component to the pre-mix receiving tank 36. Flow of the components (in this case fluids) may be individually, and selectively, controlled by one or more pumps, such as pump 40. In some embodiments, movement of a given component from the containers 34 to the pre-mix receiving tank 36 may be achieved via gravity feed. The flow of the components may further be regulated by additional mechanisms, such as valves 42.

In the example mixing machine 18 depicted in FIG. 2, each component may be separately dispensed into the pre-mix receiving tank 36 through computerized control, such as via computer system 44. Note that the computer system 44 is generally illustrated as having a wired connection to the pre-mix receiving tank 36, though it should be understood that the computer system 44 may be coupled to other components of the mixing machine 18, either through wired, wireless, or a combination of wired and wireless connections. Dispensing into the pre-mix receiving tank 36 continues from a given container 34 until the requisite weight or fluid volume required by a given recipe is detected. In the case of weight, detection may be achieved by an electronic scale 46 coupled to the pre-mix receiving tank 36. Detection of the requisite fluid volume may be achieved via a sensor 48 disposed in the surface of the pre-mix receiving tank 36, among other mechanisms of detection. The computer system 44 activates a dumping mechanism 50 responsive to signaling by the electronic scale 46 and/or sensor 48, which causes the component in the pre-mix receiving tank 36 to empty into a mixing tank 52. This process of component transfer from the container 34 to the pre-mix receiving tank 36 to the mixing tank 52 is repeated for each component required to be mixed according to the given recipe. The specific amounts and order of addition of each component and any diluent is dictated by a control program executing on the computer system 44 in accordance with the recipe, which contemplates geofence-specific data as communicated by the farmer to the co-op office agent and incorporated in the invoice.

Note that in some embodiments, a technician may manually dispense components into the pre-mix receiving tank 36 or mixing tank 52 (e.g., after measuring out the required amount of each component). For instance, the computer system 44 may prompt each step the technician takes in the mixing process via a graphical user interface (GUI) provided on a display device in the form of instructions for the mixing.

Once all of the components of the recipe are dispensed in the mixing tank 52, the computer system 44 actuates an agitator 54 to cause the appropriate mixing of the components, and then records information corresponding to the final composition, including the recipe, date, time, technician responsible for the mixing, etc.

In one embodiment, at a time corresponding to the processing of the components (e.g., before, during, or after), the computer system 44 communicates with reader logic 56 (also referred to herein as a reader device) and sensing logic 58 (also referred to herein as a sensor or sensing device), the latter which may be an image acquisition device (e.g., camera, camcorder, etc.). The reader logic 56, through execution by a processing unit of the computer system 44, scans the smart label 22 affixed to the container 24, shown resting on a pallet 60. The scan may be implemented to ensure the container 24 is the proper container for receiving the composition from the mixing tank 52. As indicated above, the computer system 44 may perform a comparison of the scanned information with the stored information pertaining to the current mix and/or purchaser of the composition (or other factors) to determine whether a like-container (e.g., a herbicide container, a pesticide container, a fungicide container, purchaser A's container, etc.) is being used for dispensing the composition. If there is not a threshold degree of matching, the technician may be alerted (e.g., through a visual indicator such as a light or audible alarm, or via a GUI) to replace the container 24, and/or transfer mechanisms for transferring the composition to the currently-placed container 24 may be disabled or suspended.

In addition to, or in lieu of the scan, the computer system 44 may actuate the sensing logic 58 to determine if the container 24 is of the proper surface color pertaining to the current composition and/or purchaser. For instance, herbicides may always be in a green container, and if the composition is a herbicide and the container has a blue surface color, the computer system 44, receiving an indication of the surface color of the container 24 as blue, may disable or suspend any transfer mechanisms to prohibit the transfer and/or cause an appropriate audible or visual alert to the technician associated with the mixing process.

In some embodiments, the container 24 may be manually loaded onto the pallet 60 and transferred to a location proximal to the mixing machine 18. In such embodiments, visual discernment by the loading person as to the proper container type may be implemented. In some embodiments, all containers may be the same color, and there is no need for distinguishing one tank from another. In some embodiments, the loading of the container 24 proximal to the mixing machine 18 may occur at a different time in the process, such as before or during the mixing. In some embodiments, the container 24 may be automatically transported to a location for receiving the composition, such as via a conveyor, where the container is selected with, or in some embodiments, without any concern of the color of the surface of the container 24. For instance, the sensing logic 58 may have a wide range of detection, or in some embodiments, may be moveable along a row and/or stack of containers 24, 26 and responsive to a match of surface color to a given composition, or a degreedmatch (e.g., threshold) between a prior smart label 22 and the current composition, make the appropriate container selection.

Upon the optional determination of a suitable container 24 for receiving the composition, the composition is transferred from the mixing tank 52 to the container 24 via actuation by the computer system 44 of the pump 62 disposed along a conduit 64, which influences the composition to flow through the conduit 64 and enter a port 66 of the container 24.

The computer system 44 further causes the reader logic 56 to overwrite the information of the smart label 22 with the information associated with the newly derived composition, including the recipe among other information. In some embodiments, the computer system 44 and the reader logic 56 may cooperate to generate a new smart label that is affixed (e.g., manually, or via automated operation, including scribing, imprinting, fastening, etc.) to the container 24 (and the prior smart label is removed or associated information is erased). The container 24 is then ready to be placed onto the transport vehicle 28, as described above. Note that in one embodiment, the smart label machine 20 comprises the computer system 44, the sensing logic 58, and the reader logic 56, which collectively comprise a smart label system. In some embodiments, the smart label machine 20 (e.g., smart label system) may comprise fewer or additional components. Further, though shown associated with the mixing machine 18, some embodiments of the smart label system may reside at other locations within or around the dispensing facility 14, such as a fuel depot or other locations.

Figure 3:
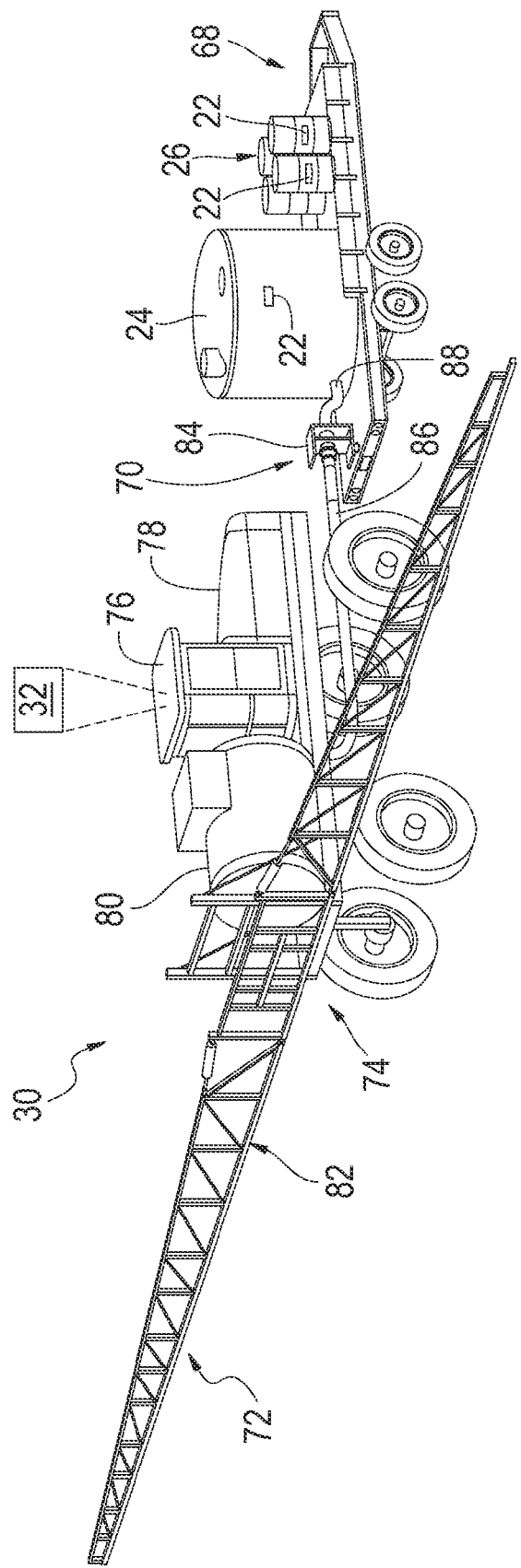
FIG. 3 is a rear perspective view of an example embodiment of a sprayer machine.

Attention is now directed to FIG. 3, which illustrates an example embodiment of a sprayer machine 30 coupled to a trailer 68 of the transport vehicle 28 (e.g., detached from the truck portion) for the transfer of one or more compositions dispensed into containers 24, 26 at the dispensing facility 14. One having ordinary skill in the art should appreciate in the context of the present disclosure that the example sprayer machine 30 and trailer 68 are merely illustrative, and that other machines or other configurations (e.g., different wheel arrangement, axle arrangement, design, etc.) with like functionality may be employed in some embodiments. The sprayer machine 30 is operable to distribute one or more compositions (e.g., liquid materials, solid materials, or a combination of both) throughout a crop field. The sprayer machine 30 and the trailer 68 are coupled to each other via a coupler assembly 70 that permits the efficient transfer of compositions between the sprayer machine 30 and one or more containers 24, 26 with smart labels 22 affixed thereto. The coupler assembly 70 serves to fill or refill the sprayer machine 30 with the appropriate composition for application to the field and/or use for fuel or other functions. It should be appreciated that, though automated filling and refilling is described in this example, manual filling and refilling may also be performed by, and benefit from, certain embodiments described herein, and hence are contemplated to be within the scope of the disclosure.

As described above, the spray machine 30 may be a self-powered vehicle comprising a sprayer assembly 72 with multiple, nozzle groups spaced apart from each other along the sprayer assembly. Each nozzle of a given nozzle group may be configured for a different flow pattern and/or trajectory, among other feature differences, and selectable manually or via automated control. In some embodiments, a single nozzle at each location may be used, with changes in performance enabled through the manner of control. In some embodiments, the sprayer machine 30 may comprise multiple vehicles, such as a tractor that tows another vehicle (e.g., trailer) with a sprayer assembly attached to the trailer. The sprayer machine 30 also comprises, among other components, a rolling chassis 74 (though track-based chassis may be used in some embodiments), a cab 76, and a hood 78 with an engine located underneath. The illustrated chassis 74 may comprise an adjustable-height chassis, though not limited to such functionality. In some embodiments, such maneuvering of the height allows for travel along different terrains and/or crop lengths, or the concomitant adjustment of the sprayer assembly height. In some embodiments, a separate mechanism may be used to adjust the height of the sprayer assembly 72. In the usual manner, the rolling chassis 74 is powered by the engine and serves to support the sprayer assembly 72.

The sprayer assembly 72 functions to distribute liquid material uniformly (or non-uniformly as needed) and includes a container 80 and boom assembly 82. The container 80 is conventional and serves to hold liquid or solid material (e.g., the composition) in the usual manner. The container 80 is mounted on the rolling chassis 74 between the boom assembly 82 and the cab 76. The boom assembly 82 includes booms and a boom support frame, as is known. The booms are shiftably attached to corresponding ends of the boom support frame. As indicated above, the boom assembly 82 supports a plurality of spray nozzles and conduits (e.g., fluid tubing) that fluidly connects the container 80 and nozzles. The boom assembly 82 may be mounted to the rolling chassis 74 adjacent an aft end of the chassis 74. Thus, as the sprayer machine 30 moves in a forward direction, the sprayer assembly 72 applies liquid material rearwardly of the chassis 74. It should be appreciated that other arrangements of constituent elements of the sprayer machine 30 are contemplated and hence within the scope of the present disclosure. As is customary, the boom assembly 82 may be foldable for transport and when obstacles in the field are encountered.

It should be appreciated that, although the coupler assembly 70 suggests the container 80 is to remain in-place for receiving one or more compositions from the containers 24, 26, in some embodiments, the container 80 may be removable, such as for replacement when damaged (or for fluid replacement) or to allow filling or refilling on-site at the farm 16 and/or at the dispensing facility 14. In some embodiments, a composition may be loaded manually by a farmer or other personnel at the sprayer machine 30 (e.g., a receptacle at the sprayer machine 30).

The coupler assembly 70 is known in the art, and in one embodiment, comprises a coupling support assembly 84 and a conduit 86. The coupling support assembly 84 serves as a junction between a conduit 88 that is coupled to an outlet port of the containers 24 or 26, and the conduit 86. The coupling support assembly 84 may further comprise shutoff valves, pumps, metering devices, among other components, to influence the flow of the components from containers 24 or 26 to the container 80. In one embodiment, the conduit 86 comprises a telescopic fill tube, powered under hydraulic, pneumatic, or electric power. The conduit 86 extends from the coupling support assembly 84 to an inlet port of the container 80 (or in some embodiments, extends to an intermediary conduit that couples to the inlet port of the container 80). Other variations are contemplated to be within the scope of the disclosure. Ultimately, the coupler assembly 70 serves to transfer the composition to the sprayer machine 30, either automatically, semi-automatically, or manually.

Internal to the cab 76 (though in some embodiments, located elsewhere) is the machine control system 32, which includes reader logic, machine control programming, sensors and other logic) that enables the selective and intelligent actuation of various machine controls, including machine navigation controls (e.g., enabling navigation of the sprayer machine 30, such as changes in speed, direction, etc.) and sprayer controls (e.g., enabling actuation of various controls that adjust nozzle performance, fluid operating parameters such as fluid flow, pressure, etc., and height adjustment) or other dispensing controls. Note that height adjustment may be implemented as a machine navigation control in some embodiments.

In one embodiment, the machine control system 32 enables an optional determination as to whether the appropriate composition is loaded or to be loaded onto the sprayer machine 30. For instance, the reader logic of the machine control system 32, through direction by the operator or automatically, responsive to sensing the containers 24, 26 within a predefined distance from the sprayer machine 32 (or other event, such as the coupling of the trailer 68 to the sprayer machine 30), may scan the smart labels 22 on containers 24, 26 on the trailer 68 to determine whether such compositions are suited for the given geofence that the sprayer machine 30 is about to traverse. In other words, since the compositions are geofence-specific, and the smart labels 22 incorporate such information, the machine control system 32 scans the smart labels 22 and makes a determination based on whether there is match (or mismatch) between the information on the smart labels 22 and the current detected location of the sprayer machine 30. In some embodiments, the sprayer machine 30 is programmed for a given geofence, and hence the machine control system 32 determines whether the information in the smart labels 22 matches (e.g., a threshold match, or mismatch) parameters corresponding to the programmed operation of the sprayer machine 30.

Mismatches cause the machine control system 32 to prohibit (e.g., through non-actuation of valves in the coupler assembly 70 or non-actuation of normally-closed valves (or actuation of normally-open valves, as another well-recognized option) associated with the inlet ports of the container 80) ingress of the composition to the container 80. In some embodiments, an alert (e.g., audio or visual) may be invoked when the scan and subsequent comparison results in a determination that the wrong containers 24, 26 are present, provoking the operator of the sprayer machine 30 (or other personnel) to investigate. Note that in some embodiments, the reader logic may be a mobile unit (e.g., handheld), in which case the operator of the sprayer machine 30 may be able to walk over to the smart labels 22 and scan them, which may be helpful when the smart labels 22 are configured as bar codes, which typically have less range.

In some embodiments, in addition to (or in lieu of) the smart label scan for the determination of whether the containers 24, 26 contain the proper composition, a sensor (e.g., image capture equipment) of the machine control system 32 may sense the surface color of the containers 24, 26 and compare the sensed surface color(s) with the expected compositions for the given geofence to traverse, and mismatches may cause the machine control system 32 to prevent transfer of the compositions and/or cause an alarm (e.g., audio or visual) to be activated that alerts the operator or other personnel, prompting further investigation.

The machine control system 32 scans the smart labels 22 to prompt the automatic adjustment of machine controls. Such adjustments may be performed before the application of the composition to the soil or vegetation of the field begins, or during traversal of the field. For instance, the smart labels 22 may comprise machine operating parameters set based on a given recipe, such as nozzle performance and sprayer assembly height, which may be adjusted prior to application of the composition. On the other hand, the speed of the sprayer machine 30 may be automatically adjusted upon engagement of gears by the operator to begin motion, and the application of the spray (or generally, dispensing of the composition) may not commence until a targeted speed (e.g., within a given tolerance) has been achieved. Further, during traversal of the field, as indicated above, the flow of the composition from one or more nozzles may be temporarily suspended to avoid the improper application to certain area attributes, and the sprayer machine direction may be automatically altered to maintain certain setback distances as defined in the smart label 22 for detected area attributes, such as detected by GPS devices or sensors. Inclement weather may be detected (e.g., by sensors) and cause the suspension of application of the composition, such as where wind velocities or vectors exceed nominal conditions for which operation of the sprayer machine 30 is based (e.g., from information in the smart label 22).

Note that in some embodiments, a certain degree of operator interaction may be invoked, such as to confirm setting adjustments by the machine control system 32. For instance, where the machine control system 32 is about to cause the sprayer machine 30 to steer the vehicle away from a detected area attribute, the machine control system 32 may alert the operator to provide an assurance that it is safe to alter the direction of travel (e.g., to avoid injury to personnel or livestock, or prevent damage to the sprayer machine 30 due to obstacles).

Having described an example embodiment of a sprayer machine 32 and cooperating elements for the transfer of the composition(s) from the trailer 68 to the machine 32, attention is directed to FIG. 4, which illustrates an example embodiment of a machine control system 32. One having ordinary skill in the art should appreciate in the context of the present disclosure that the example machine control system 32 is merely illustrative, and that other configurations with like functionality may be employed in some embodiments. For instance, in some embodiments, the machine control system 32 may omit the machine navigation and sprayer controls, and some embodiments may include such controls as part of the machine control system 32. In one embodiment, the machine control system 32 comprises a computing device having a processing unit 90, input/output (I/O) interface(s) 92, a display device 94, network interface(s) 96, sensor(s) 98, memory 100, and GPS device(s) 102, all coupled to one or more data busses, such as data bus 104. The processing unit 90 (also referred to herein as a processor) may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the machine control system 32.

The memory 100 may include any one of a combination of volatile memory elements (e.g., random-access memory RAM, such as DRAM, and SRAM, etc.) and nonvolatile memory elements (e.g., ROM, hard drive, tape, CDROM, etc.). The memory 100 may store a native operating system, one or more native applications, emulation systems, or emulated applications for any of a variety of operating systems and/or emulated hardware platforms, emulated operating systems, etc. In the embodiment depicted in FIG. 4, the memory 100 comprises an operating system 106, reader software 108, and machine control software 110 ("machine control"). The reader software 108 (also referred to herein as reader logic or simply logic) enables the reading from one or more smart labels and/or the writing to the smart labels based on a recipe and other information pertaining to the application of a composition to vegetation in a field (in similar manner as described above). The machine control software 110 (also referred to herein as machine control logic or simply logic) comprises programmed operating instructions for execution by the processing unit 90 to adjust operating parameters of the sprayer machine 30, including the actuation of various devices (e.g., actuators, pumps, valves, etc.) to control the distribution of a composition from a sprayer machine 30 and various devices that control the navigation of a sprayer machine 30 (e.g., speed, direction, etc.).

It is noted that in the case of towing/towed machine arrangements, the machine control system 32 may reside in the towed machine, the towing machine, or in both, such as where the towing machine has multiple uses (e.g., a tractor). In one embodiment of such a combination machine (e.g., comprising the towing machine and the towed machine, the combination also referred to merely as a machine as explained above) where the machine control system 32 resides in the towing machine, the reader logic 108 resides at the towing machine and based on the scanned information (from a smart label 22), the machine control logic 110 (also residing at the towing machine) adjusts machine navigation controls residing on the towed machine and further communicates control (e.g., actuation) signals to dispensing controls (e.g., sprayer assembly controls, seeding assembly controls, etc.) residing in the towed machine. In some embodiments, the machine control system 32 may reside in the towing machine and the towed vehicle may incorporate a subset of the machine control system 32, such as the machine control logic 110. In this latter embodiment, the scanned information may be acted upon by the machine control logic 110 residing in the towing machine to adjust navigation controls for the towing machine, and the scanned information may be communicated by the reader logic 108 residing in the towing machine to the machine control logic 110 in the towed machine, in which the machine control logic 110 (in the towed machine) adjusts the various dispensing controls residing in the towed machine. In some embodiments, the machine control system 32 may reside completely in the towed machine, for signaling to machine navigation controls in the towing machine while acting upon the dispensing controls in the towed machine (e.g., a reverse of the first combination embodiment above), or in some embodiments, the towing machine may comprise a subset of the machine control system 32 (e.g., the machine control logic 110) where scanned information conveyed by the reader logic 108 residing in the towed machine is communicated to the machine control logic 110 of the towing machine. In some embodiments, both towing and towed machines may each have a machine control system 32 residing therein, and which machine serves as the master or slave depends on the proximity of the smart label 22 to the reader logic 108 of the towing or towed machine, or based on other criteria (e.g., operator control, etc.).

The I/O interfaces 92 may comprise any number of interfaces for the input and output of signals (e.g., analog or digital data), including the output of actuation or setting signals caused by execution of the reader software 108 or machine control software 110 to actuate or adjust settings for each nozzle group 112 disposed along the boom assembly 82, chassis control 114 (e.g., for raising or lowering the chassis and/or sprayer assembly 72), and engine and drivetrain 116. Other machine controls and devices, such as audible alarms, warning lights, etc. may be controlled through the I/O interfaces 92. In one embodiment, communication among devices of, or coupled to, the machine control system 32 is via one or more controller area networks (CAN) or other network(s).

The display device 94 comprises one of a variety of types of displays, including liquid crystal diode (LCD), among others, that provides an outputted graphical user interface (GUI) to an operator to provide alerts or instructions. In some embodiments, the display device 94 may comprise a head-mounted type display.

The network interface 96 includes functionality to enable wired or wireless communication, such as locally or via a network to a remote location. As a non-limiting example, the network interface 96 may include a modulator/demodulator (e.g., a modem), wireless (e.g., radio frequency (RF)) transceiver, a telephonic interface, among other network components.

The sensor(s) 98 include image capture devices (e.g., image or video capture), and environmental sensors (e.g., wind, temperature, etc.), among other sensors, that provide information to the machine control software 110.

The GPS device 102 enables guided traversal by the sprayer machine 30 over a given field, and detection of area attributes or other machines that results in signaling by the GPS device 102 that may be acted upon by the machine control software 110 to cause suspension or cessation of the application of a composition from the sprayer machine 30, a change in direction or halting of the sprayer machine 30, among other functions.

Figure 4:
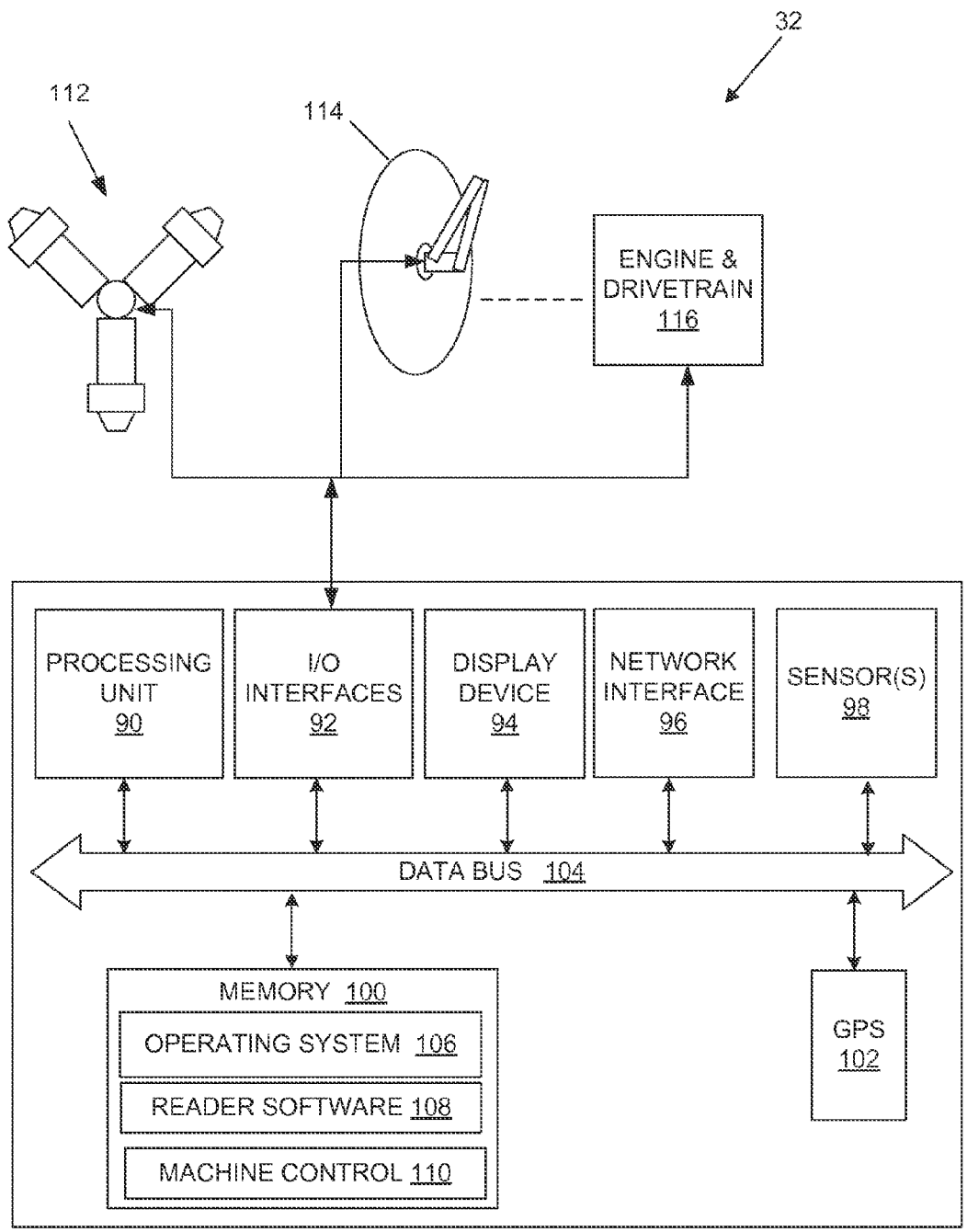
FIG. 4 is a block diagram of an example embodiment of a machine control system.

It should be appreciated that other elements may be employed in the operation and/or control of the sprayer machine 30 that are not shown for brevity. Further, note that in some embodiments, functionality of one or more of the elements depicted in FIG. 4 may be combined, or further distributed among additional elements. For instance, functionality of the reader software 108 and machine control software 110 may be combined, or distributed among hardware and software functionality. In some embodiments, the operating system 106 may be omitted.

Where the reader software 108 and/or machine control software 110 are implemented at least in part in logic configured as software/firmware, as depicted in FIG. 4, it should be noted that the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

Where functionality of the reader software 108 and/or machine control software 110 are implemented at least in part in logic configured as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
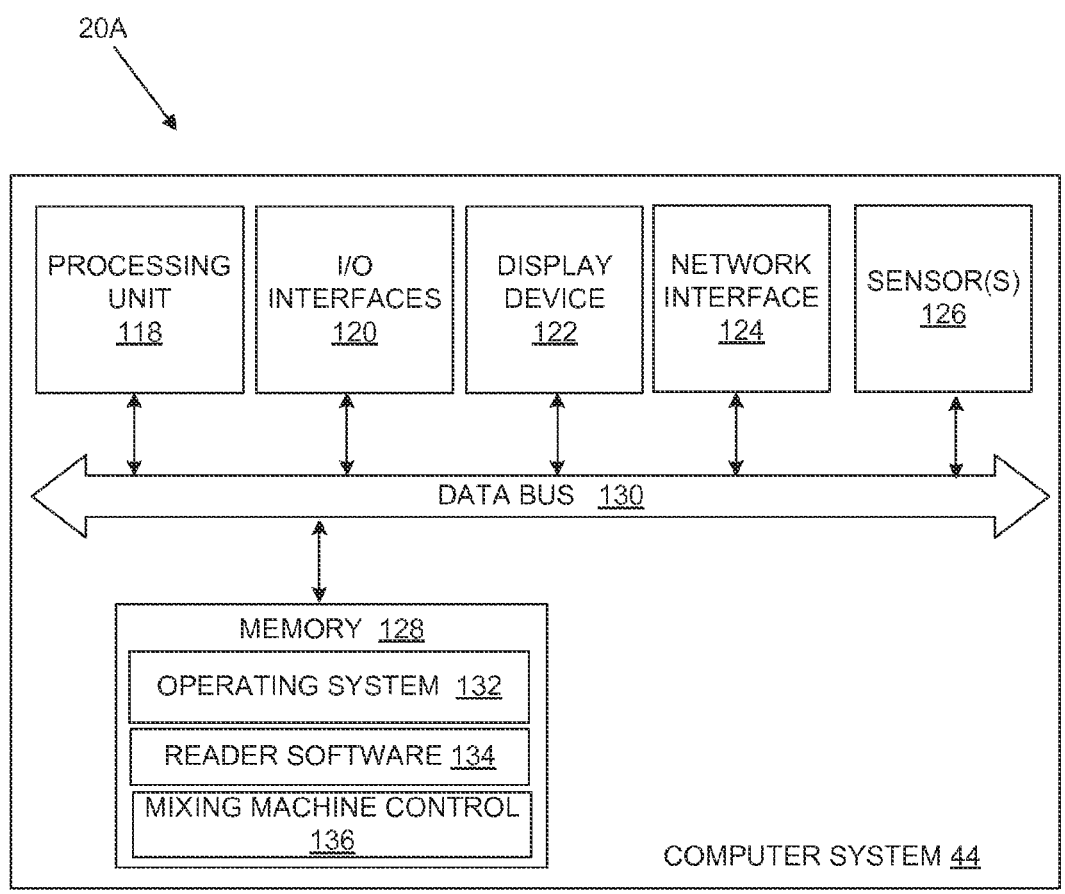
FIG. 5 is a block diagram of an example embodiment of a smart label system.

Referring now to FIG. 5, shown is an example embodiment of a smart label machine 20A, which in one embodiment comprises a smart label system. One having ordinary skill in the art should appreciate in the context of the present disclosure that the example smart label machine 20A is merely illustrative, and that other configurations with like functionality may be employed in some embodiments. In one embodiment, the smart label machine 20A is embodied as the computer system 44 (e.g., similar to that shown in FIG. 2) that comprises a processing unit 118, input/output (I/O) interface(s) 120, display device 122, network interface(s) 124, sensor(s) 126, memory 128, all coupled to one or more data busses, such as data bus 130. The memory 128 comprises an operating system 132, reader software 134, and the mixing machine control software 136 ("mixing machine control"). Like-named components to those described above in association with FIG. 4 are similar in functionality, and hence discussion of the same is omitted here for brevity except where noted below. Further, functionality of the sensors(s) 126 and the reader software 134 may be implemented as separate components or devices (e.g., sensing logic 58, reader logic 56), each coupled to the computer system 44 via the I/O interface(s) 120, similar to the smart label machine embodiment shown in FIG. 2.

The mixing machine control software 136 (also referred to herein as mixing machine control logic, mixing machine logic, or simply logic) comprises functionality to control the mixing of constituent components to derive a final composition. In some embodiments, the mixing machine control software 136 may comprise additional functionality associated with the selection and positioning of a proper container for dispensing the composition, although in some embodiments, a separate controller or device may be used in cooperation with the mixing machine control software 136 to achieve the container selection; or in some embodiments, such additional functionality may be omitted.

It should be appreciated that other known elements may be employed in the operation and/or control of the smart label machine 20A that are not shown for brevity. Further, note that in some embodiments, functionality of one or more of the elements depicted in FIG. 5 may be combined, or further distributed among additional elements. For instance, functionality of the reader software 134 (also, reader logic) and mixing machine control software 136 may be combined, or distributed among hardware and software functionality.

Where the reader software 134 and/or mixing machine control software 136 are implemented at least in part in logic configured as software/firmware, as depicted in FIG. 5, it should be noted that the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

Where functionality of the reader software 134 and/or mixing machine control software 136 are implemented at least in part in logic configured as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
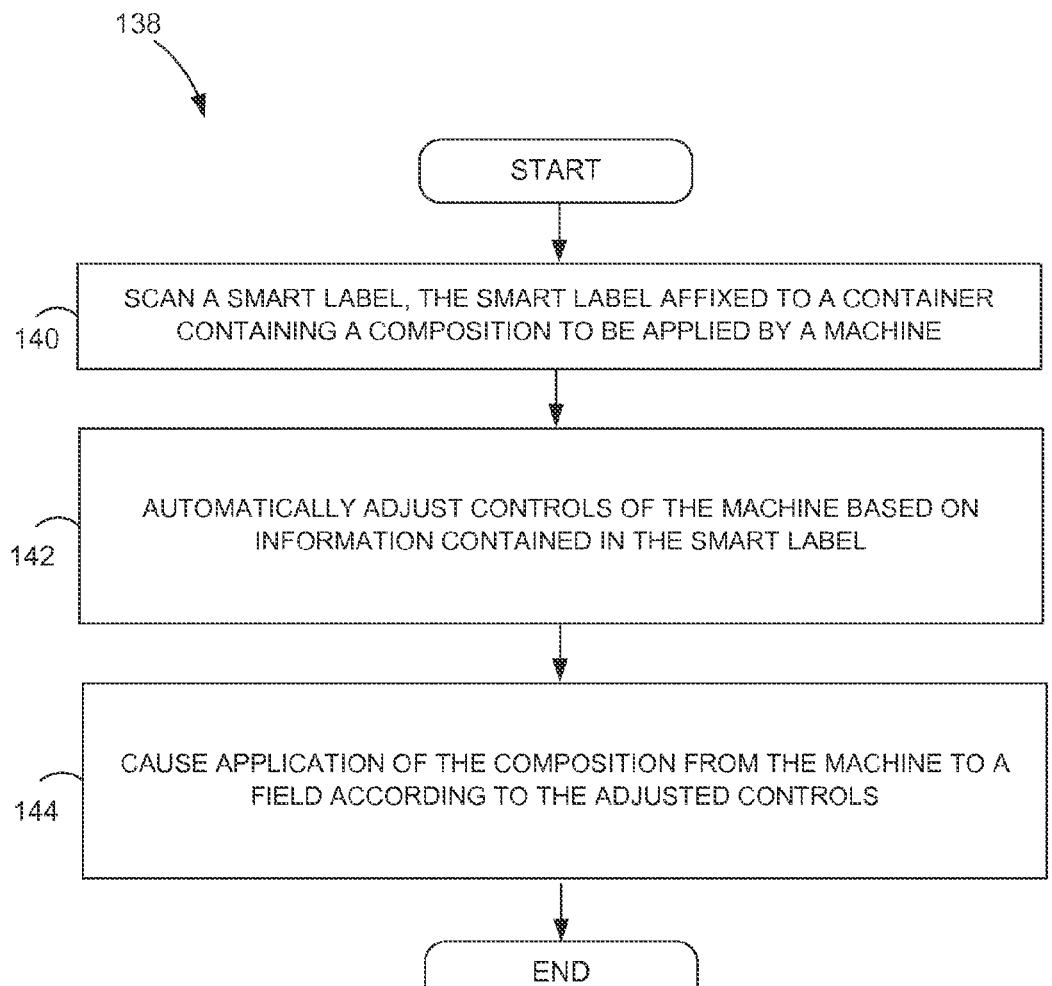
FIG. 6 is flow diagram that illustrates an example embodiment of a method for controlling operation of a sprayer machine.

In view of the above description, it should be appreciated in view of the present disclosure that one embodiment of a method for controlling operation of a machine, depicted in FIG. 6 and denoted as method 138 comprises: scanning a smart label, the smart label affixed to a container containing a composition to be applied by the machine (140); automatically adjusting controls of the machine based on information contained in the smart label (142); and causing application of the composition from the machine to a field according to the adjusted controls (144).

Figure 7:
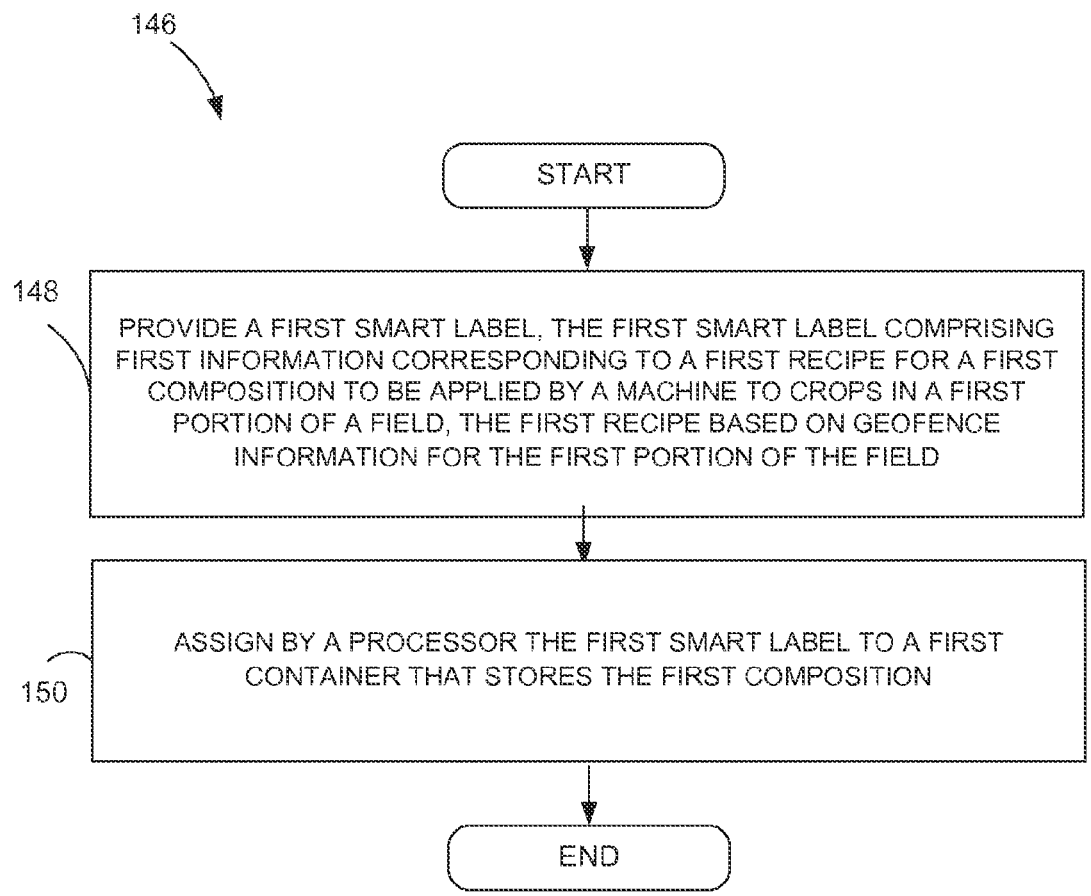
FIG. 7 is a flow diagram that illustrates an example embodiment of a method for avoiding misapplication of the contents of one or more containers.

In view of the above description, it should be appreciated in view of the present disclosure that an embodiment of a method for controlling operation of a machine, depicted in FIG. 7 and denoted as method 146 comprises a method for avoiding the misapplication of contents in one or more containers, the method comprising: providing a first smart label, the first smart label comprising first information corresponding to a first recipe for a first composition to be applied by a machine to crops in a first portion of a field, the first recipe based on geofence information for the first portion of the field (148); and assigning by a processor the first smart label to a first container that stores the first composition (150). Note that, although referenced to application to crops in a field, in some embodiments, other applications are contemplated such as application to the soil (e.g., seeds) or other surfaces.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A combination machine, comprising:
   a dispensing machine comprising a dispensing assembly configured to dispense an agricultural composition to a field; and
   a container containing the agricultural composition to be dispensed, the container comprising a smart label containing information about a recipe of the composition contained in the container and a specific geofence of the field on which the composition is to be dispensed;
   wherein the specific geofence of the field is a specific area that the agricultural composition in the container is to be dispensed, and includes, one or more boundaries, and one or more buffer zones;
   wherein the dispensing machine comprises a machine control system configured to:
      scan the smart label affixed to the container to extract the information;

determine whether the specific geofence for the field specified in the scanned information corresponds to the area of the field being traversed by the combination machine and alert an operator if the combination machine is not positioned within the specified geofence of the field; and adjust controls of the dispensing machine based on the scanned information.

2. The combination machine of claim 1, wherein the dispensing assembly comprises the dispensing controls that comprise one or more actuators that enable dynamic adjustment of dispensing of the composition to a field.

3. The combination machine of claim 2, wherein the machine control system is configured to automatically adjust the dispensing machine by communicating a control signal to the one or more actuators to actuate a dispensing of the composition according to the scanned information.

4. The combination machine of claim 2, wherein the dispensing assembly comprises a sprayer assembly.

5. The combination machine of claim 2, wherein the dispensing assembly comprises a seeding assembly.

6. The combination machine of claim 1, wherein the controls of the dispensing machine comprises machine navigation controls.

7. The combination machine of claim 1, wherein the machine control system comprises reader logic, the reader logic configured to scan the smart label.

8. The combination machine of claim 7, wherein the reader logic is configured to read the smart label based on radio frequency identification (RFID) technology.

9. The combination machine of claim 1, wherein the machine control system comprises machine control logic, the machine control logic configured to adjust the controls of the dispensing machine.

10. The combination machine of claim 1, wherein the machine control system further comprises global positioning system (GPS) devices.

11. The combination machine of claim 1, wherein the machine control system further comprises sensors that detect a surface color of the container prior to automatically adjusting the controls, the machine control system further configured to determine whether the container surface color matches an expected surface color of the container.

12. The combination machine of claim 1, wherein the combination machine comprises a towed dispensing machine and a towing machine physically coupled to the towed dispensing machine.

13. The combination machine of claim 1, wherein the combination machine comprises self-propelled dispensing machine.

14. The combination machine of claim 1, wherein the dispensing machine adjusts one or more of a spray pattern, a droplet size, or a height assembly of the dispensing assembly based on the scanned information.

* * * * *